United States Patent [19]

Honig

[11] 4,177,371

[45] Dec. 4, 1979

[54] WELDING MACHINE FOR WELDING PRE-WELD FLANGES AND SLIP-ON FLANGES ONTO PIPES

[75] Inventor: Helmut Honig, Netphen, Fed. Rep. of Germany

[73] Assignee: Deuzer Maschinenfabrik GmbH, Netphen, Fed. Rep. of Germany

[21] Appl. No.: 787,621

[22] Filed: Apr. 14, 1977

[30] Foreign Application Priority Data

Apr. 17, 1976 [DE] Fed. Rep. of Germany ....... 2617061

[51] Int. Cl.² ............................................. B23K 31/00
[52] U.S. Cl. ............................. 219/59.1; 219/60 R; 219/60 A; 219/159; 228/48
[58] Field of Search ................... 219/60 R, 60 A, 158, 219/159, 59.1; 228/47, 48

[56] References Cited

U.S. PATENT DOCUMENTS

| 3,634,648 | 1/1972 | Morris | 219/60 A |
| 3,880,340 | 4/1975 | Takeuchi | 219/60 A |

FOREIGN PATENT DOCUMENTS

| 2321848 | 4/1973 | Fed. Rep. of Germany | 219/158 |
| 2365594 | 8/1975 | Fed. Rep. of Germany | . |

*Primary Examiner*—E. A. Goldberg
*Attorney, Agent, or Firm*—Becker & Becker, Inc.

[57] ABSTRACT

A welding machine for welding pre-weld flanges and slip-on flanges onto pipes which includes an upper welding station and a lower welding station for respectively welding a flange onto a pipe from the outside and the inside of the pipe. Both welding stations are as a unit supported by a stand.

2 Claims, 5 Drawing Figures

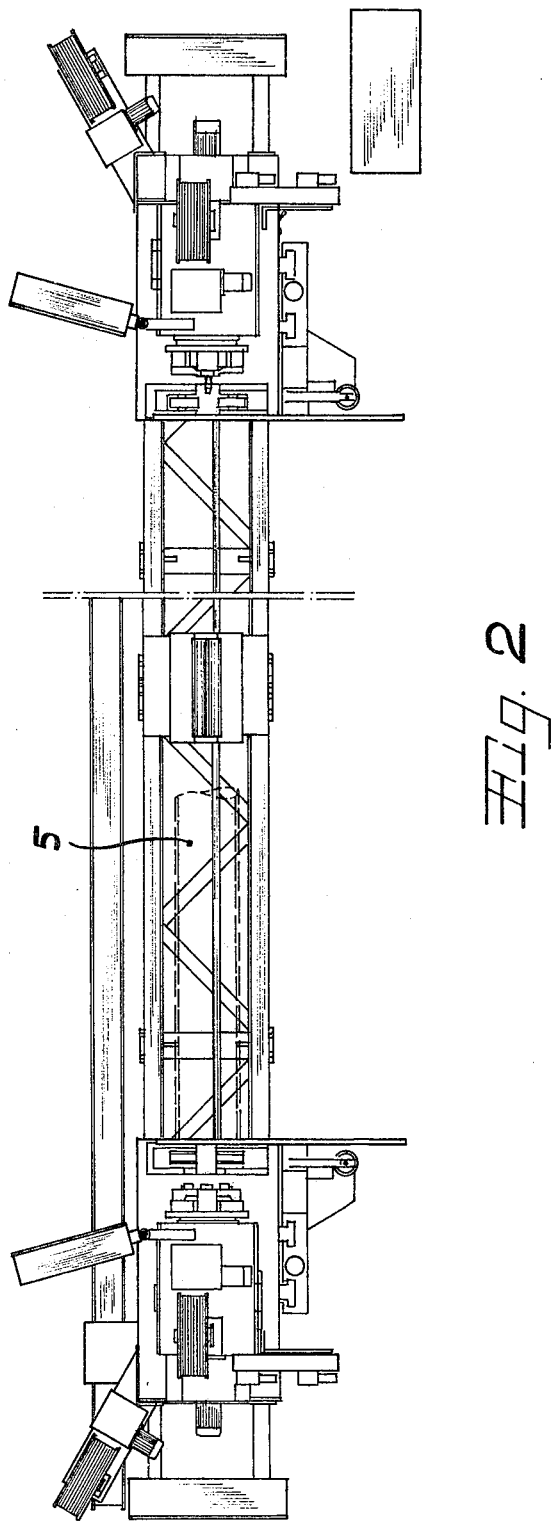

WELDING MACHINE FOR WELDING PRE-WELD FLANGES AND SLIP-ON FLANGES ONTO PIPES

The present invention relates to a welding machine for welding onto pipes preweld flanges and slip-on flanges.

Preweld and slip-on flanges are in conformity with the present art provided on pipes in such a way that first the flange is so-to-speak "stitched" to the pipe so that the distance corresponds to the prescribed measurement conditions and that the flange holes provided at both ends of the pipes are in alignment with each other. Subsequently thereto the welding proper of the pre-weld flange or slip-on flange to the pipe is effected.

With a preweld flange, the one welding to the pipe is effected only on the outside, whereas with the slip-on flange the welding is effected on the outer side as well as on the inner side.

The mounting of preweld flanges and of slip-on flanges on pipes in the heretofore known manner requires considerable work and also is mechanically with regard to the arrangement of the slip-on flanges is considerably expensive.

It is, therefore, an object of the present invention to provide a welding machine for welding onto pipes preweld flanges and slip-on flanges, without the necessity that the flanges prior to the welding thereof on the said pipe have to be "stitched" to the pipe, by a special device, while it is possible to weld both types of flanges to a pipe.

These and other objects and advantages of the invention will appear more clearly from the following specification in connection with the accompanying drawings, in which:

FIG. 2 is a top view of FIG. 1.

The welding machine according to the present invention is characterized primarily in that below the upper welding station for the outer welding of the pipe there is provided a second welding station for the inner welding of the pipe. The welding machine according to the invention is furthermore characterized in that both pipe welding stations on a common stand form a unit. Inasmuch as the outer and inner welding occur successively, the invention furthermore provides that the pipes can be lowered from the upper welding station to the lower welding station by means of an auxiliary device of a hydraulic, pneumatic or the like type which in the central portion of the length of the pipe is connected to the stand.

The adjusting of the flange to be welded onto the pipe, may it be a preweld flange or a slip-on flange, is according to a further development of the invention realized by associating for the outer welding operation separate chucking heads with the preweld flange or slip-on flange and the pipe respectively.

Figure 1:
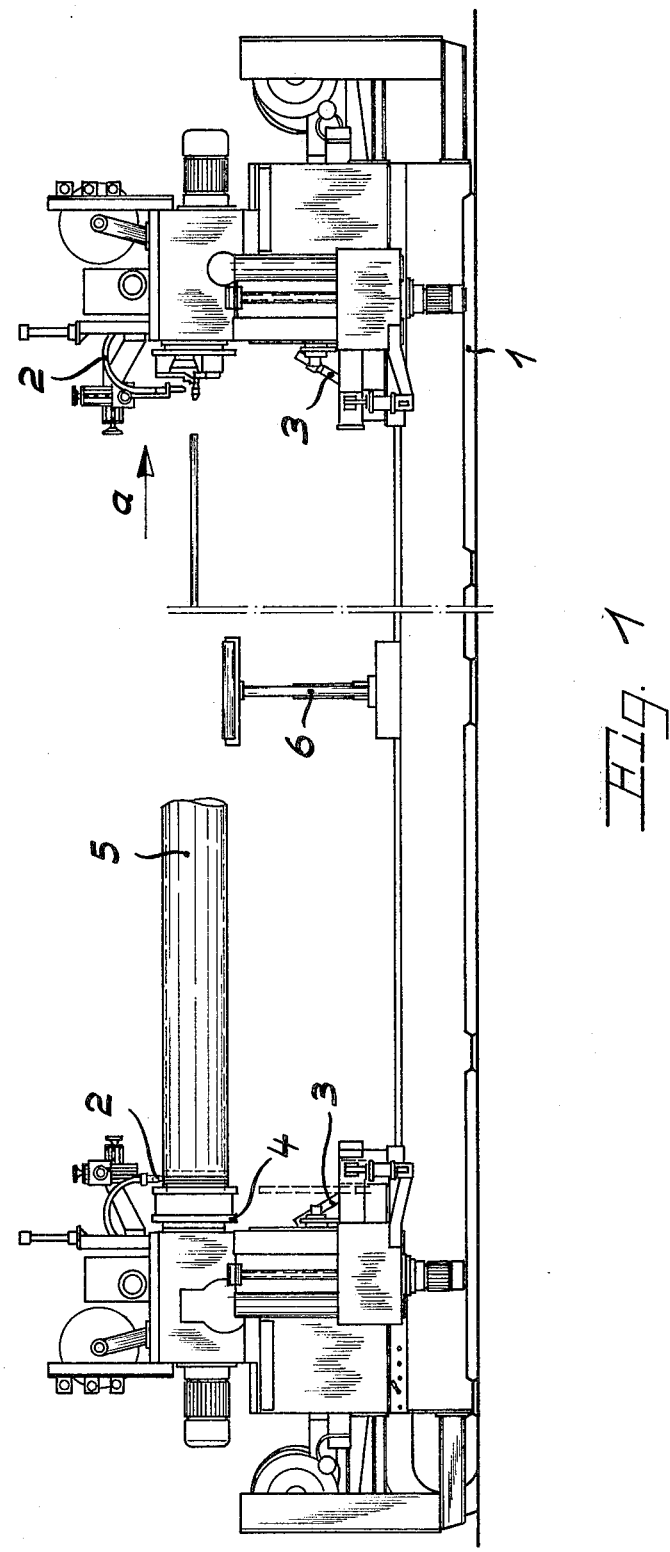
FIG. 1 is a side view of a welding machine according to the invention.
Figure 4:
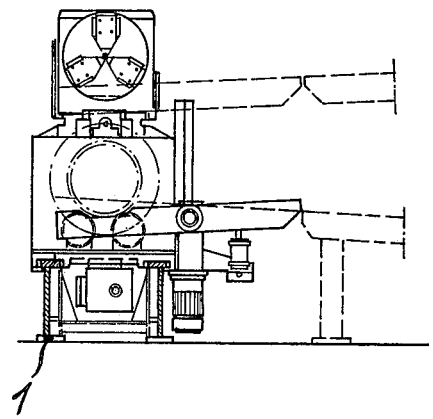
FIG. 4 is a view of FIG. 1 as seen in the direction of the arrow A in FIG. 1.
Figure 3:
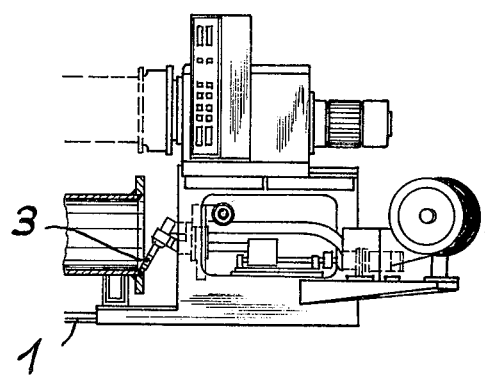
FIG. 3 is a partial side view of the welding machine of FIG. 1 while showing the inner welding of the pipe.
Figure 5:
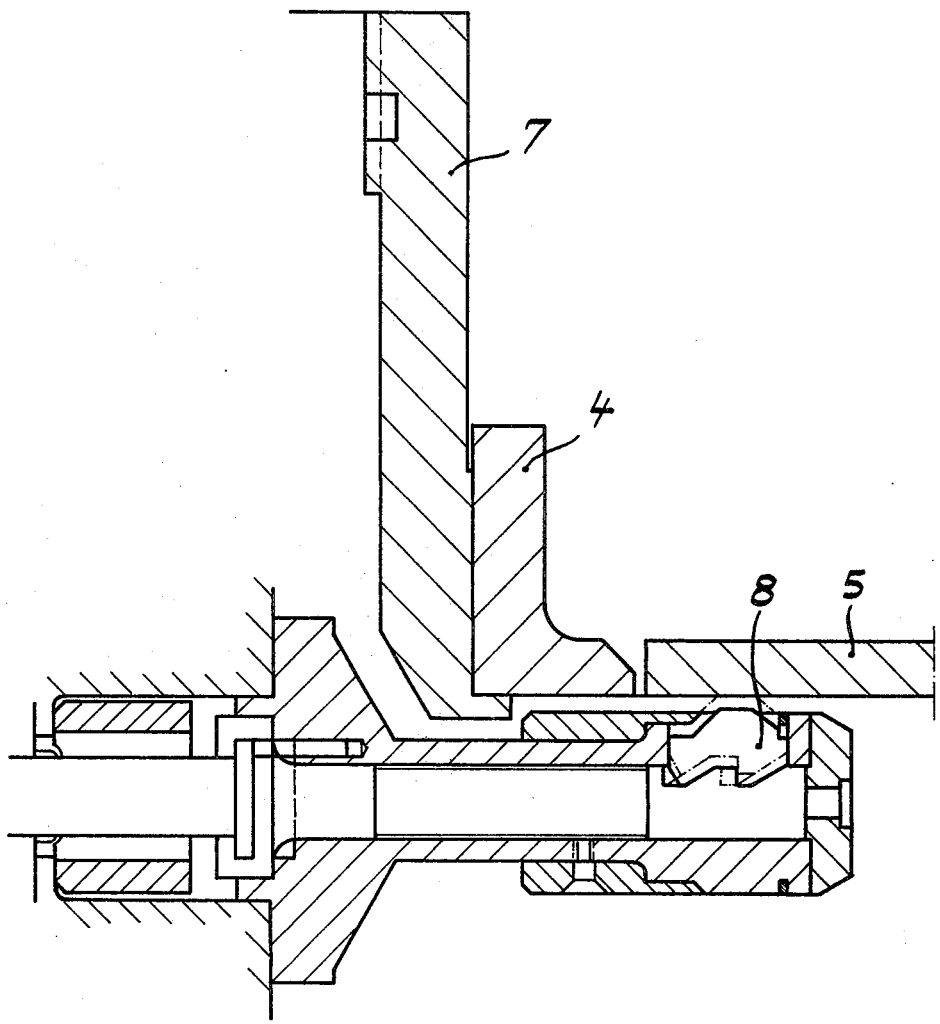
FIG. 5 shows a section through the chucking heads for the pipe and for the flange to be welded onto the pipe.

Referring now to the drawings in detail, the welding machine according to the present invention for welding preweld flanges and slip-on flanges onto pipes, comprises a common stand 1, an upper welding station 2 and a lower welding station 3. The pipe outer welding is effected in the upper welding station 2, and the pipe inner welding is effected in the lower welding station 3. The pipe outer welding is clearly evident from FIG. 1 whereas the pipe inner welding can be seen in FIG. 3. The pipe 5 which through the outer welding is connected to the flange 4 can if a slip-on flange is involved be lowered into the lower station by means of an auxiliary device 6 which may for instance be actuated hydraulically. The inner weld occurs in the lower station according to FIG. 3. The lowering occurs, of course, after the chucking heads for the individual elements — flange 4, pipe 5 — have been removed. If a preweld flange has to be welded to a pipe, where the outer welding only is required, it will be appreciated that after completed welding operation the pipe is removed from the working region.

As mentioned above, for the flange 4 and the pipe 5 there are respectively provided separate chucking heads. For the flange 4 the chucking head 7 is employed whereas for the pipe 5 the chucking head 8 is employed. The advantages which have been realized by the separation in the holding systems for the flange 4 and the pipe 5 are as follows.

The two welding stations combined to a unit will in their arrangement one below the other make possible a continuous welding to the pipes of flanges, may they be preweld flanges or slip-on flanges. In the upper welding station, the outer welding is effected, and in the lower welding station only the inner welding is effected. Particularly advantageous is the employment of the welding machine according to the invention in connection with slip-on flanges where an outer welding and an inner welding is necessary. In such instances, after the outer weld has been effected and the pipe with the flange has been lowered into the lower station, the inner welding can be effected in said lower station, while simultaneously in the upper station a new pipe can be provided with flanges. This results in a considerable saving of time. Furthermore, a considerable advantage consists in the fact that the "stitching" of the flanges onto the pipe is no longer necessary because for the flange as well as for the pipe a separate chucking head is used which structurally is so designed that it will assure a safe welding gap adjustment and also an alignment of the flange holes.

It is, of course, to be understood that the present invention is, by no means, limited to the specific showing in the drawings, but also comprises any modifications within the scope of the appended claims.

What I claim is:

1. A welding machine for welding preweld flanges and slip-on flanges onto pipes, which includes an upper welding station for welding a flange onto a pipe from the outside thereof, a second welding station for welding a flange onto a pipe from the inner side thereof, a stand common to both said upper welding station and said inner welding station and supporting said two welding stations as a unit, and fluid operable supporting means operable to engage about the central portion of a pipe to which a flange has to be welded and to lower such pipe from said upper welding station to said lower welding station and to lift said pipe from said lower welding station to said upper welding station, said fluid operable supporting means being connected to said stand.

2. A welding machine according to claim 1, which includes different chucking heads for chucking preweld flanges and slip-on flanges respectively.

* * * * *